United States Patent Office 3,408,289
Patented Oct. 29, 1968

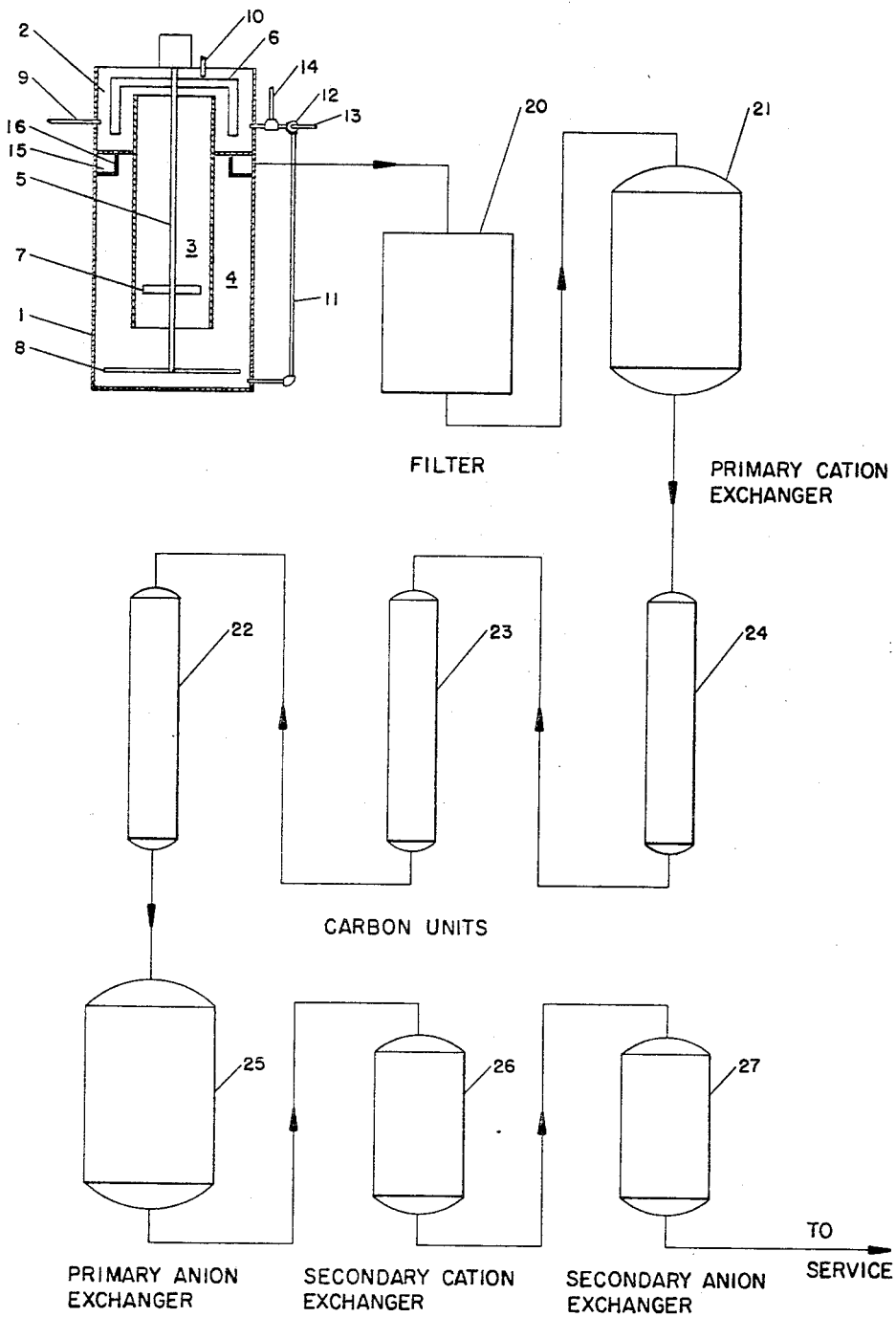

3,408,289
METHOD FOR WASTE WATER RENOVATION
Hilding B. Gustafson, Tucson, Ariz., assignor to Fuller Company, Catasauqua, Pa., a corporation of Delaware
Filed Sept. 1, 1965, Ser. No. 484,373
6 Claims. (Cl. 210—27)

This invention relates to a process for the purification of liquid. More particularly, the invention relates to a method of treating sewage plant effluent.

It is an object of this invention to provide a process for the conversion of waste treatment effluent into potable water.

Another object of this invention is to provide a low cost method of renovating treated waste plant effluent for reuse.

Other objects will become apparent upon studying the accompanying specification and drawing.

With a rapidly expanding population drawing more and more on our water resources which are becoming increasingly polluted, new ways of making these resources usable and finding new resources becomes necessary.

Sea water is being used and economical desalinization plants and processes are being designed and built. My process, however, deals with another possible source of drinkable water available to every municipality but which has heretofore not been developed. I have discovered an effective and low cost method of converting municipal waste treatment effluent into a potable water supply. With my system the circuit would be basically closed with only additional make-up water required from other sources to replenish evaporation losses and the like.

Most treatment methods now used to process sewage effluent are not directed toward insuring a potable effluent. Mostly, sewage is treated for special needs such as cooling water supplies or is minimally treated to meet ordinances and requirements for dumping into lakes and streams. For this type of treatment conventional methods such as clarification followed by settling or biological methods are normally practiced. Some of the more advanced technology, such as that developed under experimental research programs, recognizes that additional treatment practices such as filtration and perhaps adsorption in column of activated carbon may be necessary. These latter programs nevertheless have not been entirely satisfactory as COD (Chemical Oxygen Demand) residuals, which are an indication of organic materials present, remain relatively high.

I have discovered an advanced waste treatment process which, by the proper sequence of operation and with the addition of several demineralization steps, greatly improves performance over prior art processes. Although demineralization has found wide acceptance in certain fields, such as the areas of the power generating industry, the sugar industry and the like; heretofore ultimately complete demineralization has not been used in the treatment of sewage. My system combines the process steps of softening, flocculation, filtration, demineralization and carbon adsorption. With my system the step of adsorption of organic matter is greatly enhanced as it is carried out at a low pH. A further advantage of my process, also probably due to the low pH, is control of microbial growth.

My invention will be more readily understood by reference to the drawing showing a flow diagram according to the invention.

The initial step of my process consists of introducing biologically oxidized sewage plant effluent into a clarification unit of some type. This unit may be a sludge blanket type clarifier or a high rate solids contact unit which practices slurry recirculation. Preferably I use an apparatus such as shown in my copending application Ser. No. 250,-813, filed Jan. 11, 1963, entitled "Process and Apparatus for Producing Dense Sludge," now Patent No. 3,247,165.

The apparatus of this latter invention is relatively simple and basically comprises a tank 1 separated into an upper mixing and reaction chamber 2, a central flocculation chamber 3, and a clarification zone 4. Motor driven shaft 5 with blades 6 and 7 acts to aid precipitation and flocculation. A stirrer 8 is located at the lower end of shaft 5.

Treated sewage effluent is introduced by conduit 9 to the mixing and reaction chamber 2. A pipe 10 discharges coagulant into central chamber 3 by spilling it over blade and into the upper portion of chamber 3. Sludge recirculation pipe 11 leads from the lower portion of the tank and discharges into the mixing and reaction chamber 2 under the pressure of ejector 12 operated by pressure of line 13 through which sewage effluent to be treated also flows. Precipitant, such as lime is introduced through conduit 14, so that in operation precipitant and raw sludge are jointly discharged into the mixing and reaction chamber. Clarified treated liquid enters effluent launder 15 through orifices 16 from which it is withdrawn.

Following the treating unit is a sand filter 20 of standard design. Subsequent in the flow diagram are the primary cation exchange unit 21, successive activated carbon adsorption units 22, 23, and 24 and the primary anion exchange unit 25. Final demineralization through the secondary cation and anion exchange units 26 and 27 comprises the final steps in my novel treatment process.

In operation the process of my invention is as follows: Treated sewage effluent is introduced through conduit 9 into the mixing and reaction chamber 2 of treating unit 1. Precipitant added through pipe 14 and sludge recycled through conduit 11 are together discharged into the mixing and reaction chamber and a coagulant is added into the central chamber 3 through pipe 10. The liquid and reagents flow downwardly through the center chamber 3 and the precipitation and coagulation reactions are promoted. Sludge settles from the treated liquid to the bottom of the unit 1 and is recycled through pipe 11 to further aid in the chemical precipitation reaction. The bottom stirrer 8 keeps the sludge in a semifluid state. Clarified liquid rises toward and into the effluent launder 15 through the orifices 16 and is withdrawn from the unit.

The sludge in this unit is recirculated many times thus, yielding a very high density, low volume sludge. This initial treating step operates to remove alkalinity, hardness, phosphates, suspended solids and COD. The effluent withdrawn from the unit is a relatively clear liquid of high pH.

Additional suspended matter, turbidity, as well as some of the phosphates are removed in the next step of the process by passing the effluent from the treating unit through a sand filter 20.

After filtration the liquid is passed through a primary cation exchange unit 21 which may contain any suitable type of cation resin which, when the liquid passes through it, will exchange the calcium, magnesium, sodium and any remaining iron present in the liquid for hydrogen. The treated and filtered water, which was alkaline in character when introduced into the exchanger, is now quite acidic in character, having a pH of about 2 to 3 due to the nitric, sulphuric and hydrochloric acids contained therein. The cation beds are periodically regenerated, by apparatus not shown, with a strong acid when they become exhausted. The principles underlying ion exchange are well known in the industry and a detailed description is not warranted here.

In accordance with the invention, the effluent from the cation exchanger is now passed to a succession of downflow activated carbon adsorption columns 22, 23 and 24. The adsorptive capacity of these beds removes essentially all of the taste and odor causing organic substances as well as further reducing the COD. One important feature of my invention is the placement of the cation exchanger unit 21 just ahead of the activated carbon units. Contrary to some generally accepted views, I have discovered that removal of organic pollutants from waste water on activated carbon adsorption beds is greatly improved by operation at a low pH as lower residues resulted and higher bed loadings became possible. The phenomena of adsorption are complex and it appears that both the chemical and physical properties of the substance to be absorbed greatly affect the degree of adsorption. The reason why a low pH favors adsorption of sewage effluent is probably partially due to the lower solubility of the impurities in water at this pH range but, whatever the underlying principal, I have found a pH of from about 2 to 3 an optimum range for adsorption in my process. To insure good organic removal and to allow operation at higher flow rates, I prefer to use a battery of several activated carbon beds, for instance, three are shown in the accompanying flow diagram. This gives an effective bed carbon column of good depth. Also, as a practical matter, with multiple beds it is possible to continue operation through the remaining units while one unit is being cleaned. Operationally, when the bed becomes packed and the head loss substantial these units are backwashed to loosen the bed.

Following the carbon adsorption step, a further demineralization step, that of weak base anion exchange occurs in unit 25.

The final steps in the process are secondary cation and anion exchange carried out in units 26 and 27. These units operate in the same manner as do units 21 and 25 and operate to remove the "slippage" of mineral salts remaining in the water after the primary ion exchange steps.

To test the effectiveness of my process a pilot plant was placed in operation from January to July 1965, at the municipal sewage plant in Tucson, Ariz. A high density solids contact unit 42" in diameter and of the the type hereinabove described was installed. The influent to the unit was variable in nature and was either biologically treated effluent from an activated sludge process or effluent from a trickling filter and in some instances, a mixture of both effluents was introduced into my process. An analysis showed the treated sewage introduced into my process to have the following average characteristics:

| | |
|---|---|
| pH | 7.5 |
| P | 0 |
| M | 270 |
| TH | 210 |
| $NH_3$ | 20–30 |
| $PO_4$ | 20–40 |
| Cl | 125 |
| $SO_4$ | 155 |
| Turbidity | 25 |
| Odor | musty |
| Color | 24 |
| $SiO_2$ | 32 |
| ABS | 5–6 |
| COD | 65 |

The above and the following analyses express alkalinity, hardiness, sulphates and chlorine in terms of calcium carbonate. P represents alkalinity to phenolphthalein, M the alkalinity to methyl orange, and TH is the total hardness expressed in p.p.m.

This influent was pumped at a rate of 15 g.p.m. to the high rate solids contact unit. A solution of ferrous sulphate and water was fed to the unit by a chemical feeder of the diaphragm type and introduced into the upper end of central reaction chamber 3 by pipe 10 as a coagulant. It was found that introduction of the coagulated at this point resulted in the best clarification and removal of turbidity and suspected solids. Lime was used as a precipitant and was fed with water in the form of a slurry through pipe 14 and was mixed with the return sludge just prior to introduction into the primary mixing zone of the treating unit. The amount of lime feed was set at 314 p.p.m. The precipitation reactions therein were promoted by maintaining a heavy sludge concentration in the unit and the clarified water withdrawn showed an average analysis as follows:

| | |
|---|---|
| pH | 10.9 |
| P | 148 |
| M | 208 |
| TH | 138 |
| $NH_3$ | 20–30 |
| $PO_4$ | 0.8 |
| Odor | musty |
| Color | N.D. |
| $SiO_2$ | 27 |
| COD | 45 |

The treating plant effluent was then filtered on a small float-controlled sand filter having a bed of graded gravel and sand to remove suspended matter in the effluent. When the pressure differential was three pounds or more, which occurred every three to four days, the filter was backwashed with tap water to unclog it.

After filtration analytic tests showed the water to have the following average characteristics:

| | |
|---|---|
| P | 128 |
| M | 174 |
| TH | 106 |
| $PO_4$ | 0.76 |
| Cl | 125 |
| Turbidity | 3 |
| Odor | musty |
| $SiO_2$ | 26 |
| ABS | 1.8 |
| COD | 40 |

As an operational procedure it was decided to reduce the flow rate through the remainder of the process to 1 liter/minute.

Demineralization through the primary cation exchanger followed filtration as shown in the flow diagram. The cation exchanger unit was 6" in diameter and had a resin bed depth of 50". A commercially standard exchange resin, Duolite C–20 as manufactured by Diamond Alkali Corporation of Redwood City, Calif., was used. The calcium, magnesium, and sodium ions were exchanged for hydrogen and acids accordingly formed. This reduced the pH of the water to between 2 and 3. This reduction of pH enhanced the subsequent step of carbon adsorption.

The low pH at this point in my process resulted in a good control on microbial growth. Most microorganisms cannot survive below a pH of 4.0 as the key enzyme proteins become denaturized. Observation of jar samples taken before and after the cation exchange step showed that no visible biological growth occurred after this process step.

The carbon units consisted of 3 six-inch corrosion-proof plastic tubes containing beds of activated carbon manufactured expressly for water purification. The flow was downward through the bed and each bed was approximately 50 inches in depth and contained about 0.8 cubic foot of activated carbon.

To remove the anions of the acids from the liquid undergoing treatment, primary anion exchange followed carbon adsorption. This exchanger was a 6" diameter downflow unit with the resin being Duolite A–30B also manufactured by Diamond Alkali Corporation. As the liquid entered the primary anion exchange unit it had a pH of about 2 to 3.

The regenerant for the anion exchanger was prepared by diluting 540 ml. of 22° Be. aqua ammonia with demineralized water to a volume of 3.6 U.S. gallons. The regenerant for the cation exchanger was prepared by mixing 375 ml. of concentrated sulfuric acid with 6 gallons of Tucson tap water. The regenerant solutions were passed counter-currently first through the secondary exchangers and then through the primary exchangers. Application rates were 1600 ml./min. and 1100 ml./min. for the cation and anion beds respectively.

Following completion of the primary demineralization the water was passed to a secondary cation and anion exchanger to remove any remaining mineral salts which may not have been removed in the primary steps. These two units were much smaller than the primary units being 3″ in diameter and having 18″ bed depths.

The demineralizer units were designated and operated to utilize essentially the stoichiometric equivalents of the acid and base regenerants. Because of this, a certain amount of "slippage" occurred through the primary exchangers which was removed in the secondary units.

The following chart compares the analysis of the final water of my process with that of Tucson tap water. The analysis of Tucson water given is an average as Tucson water, which is drawn from many different wells having different characteristics, is highly variable.

|  | Final Process Water | Tucson Tap Water |
| --- | --- | --- |
| pH | 6.5 | 7.4 |
| P | 0 | 0 |
| M | 5-30 | 170 |
| TH | 0 | 250 |
| $NH_3$ | 1 | 1 |
| Cl | 20 | 36 |
| $SO_4$ | 10 | 132 |
| Odor | 0 | 0 |
| ABS | .05 | None |
| COD | 0-2 | 0-2 |

From the above it can be seen that the result was a very good water from which the original contaminants were substantially removed. The comparison reveals that in most respects the resultant water is superior to local tap water. For instance, the final water of my process was less alkaline, lower in hardness, chloride, and sulphates. The water is now suitable for most every industrial and farming use. With chlorination, which is standard practice for bacterial safety, the water would be suitable for domestic use, including drinking.

I claim:

1. A process for waste water renovation comprising the steps of:
    (a) clarifying the effluent;
    (b) filtering the clarified effluent to remove suspended matter;
    (c) partially demineralizing the clarified and filtered effluent by treating the effluent with a cation exchange material;
    (d) treating the partially demineralized effluent with activated carbon; and
    (e) further demineralizing the effluent by treating the effluent with an anion exchange material.

2. A process according to claim 1 with the further steps of passing the anion treated effluent successively through a cation and anion exchange material.

3. A process according to claim 1 wherein the step of clarifying the effluent comprises treating said effluent in a solids contact slurry recirculation unit.

4. A method of improving the removal of organic and bacteriological substances from biologically oxidized waste effluent by treatment on an activated carbon bed which comprises first treating the effluent with a cation exchange material to lower the pH to a value of from about 2.0 to 3.0.

5. A process for treating biologically oxidized sewage effluent which comprises the steps of:
    (a) treating the effluent with a precipitant to precipitate a sludge;
    (b) continuously recycling said sludge to be mixed with untreated effluent;
    (c) adding to the sludge during each recycling additional precipitant and untreated effluent;
    (d) adding a flocculant to the recycled and newly precipitated sludge;
    (e) separating treated liquid from the flocculated sludge;
    (f) clarifying the treated liquid and withdrawing it;
    (g) filtering the clarified effluent to remove suspended solids therefrom;
    (h) treating the filtered effluent with a cation exchange material whereby the pH is reduced to about 2 to 3;
    (i) absorbing organic substance in the low pH effluent in an activated carbon; and
    (j) treating the effluent in an anion exchange material.

6. A process according to claim 5 wherein said precipitant is lime and said flocculant is ferrous sulphate.

References Cited

UNITED STATES PATENTS

| 1,886,267 | 11/1932 | Gleason et al. | 210—27 |
| 2,520,189 | 8/1950 | Zarow | 210—39 X |
| 3,218,253 | 11/1965 | Clarke et al. | 210—27 |

SAMIH N. ZAHARNA, *Primary Examiner.*